June 30, 1925.
G. L. LAVERY
1,544,242
CAST METAL WHEEL
Filed Dec. 11, 1922
4 Sheets-Sheet 1
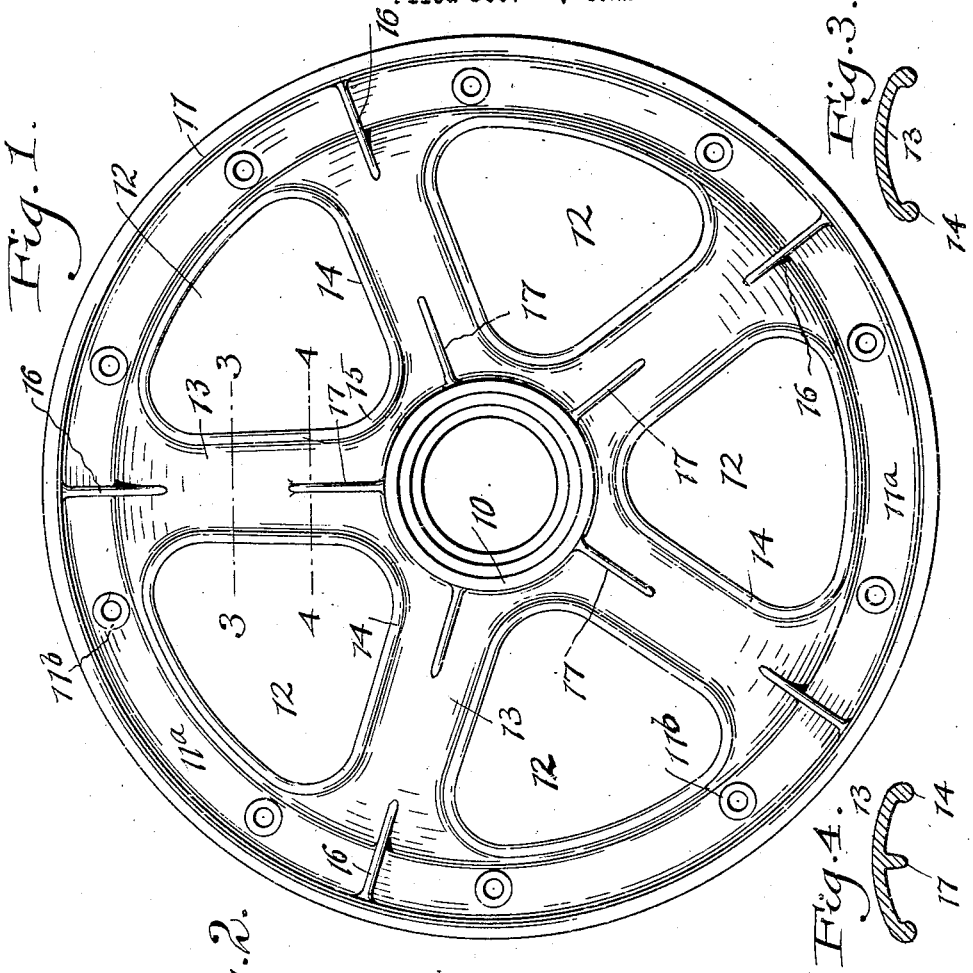
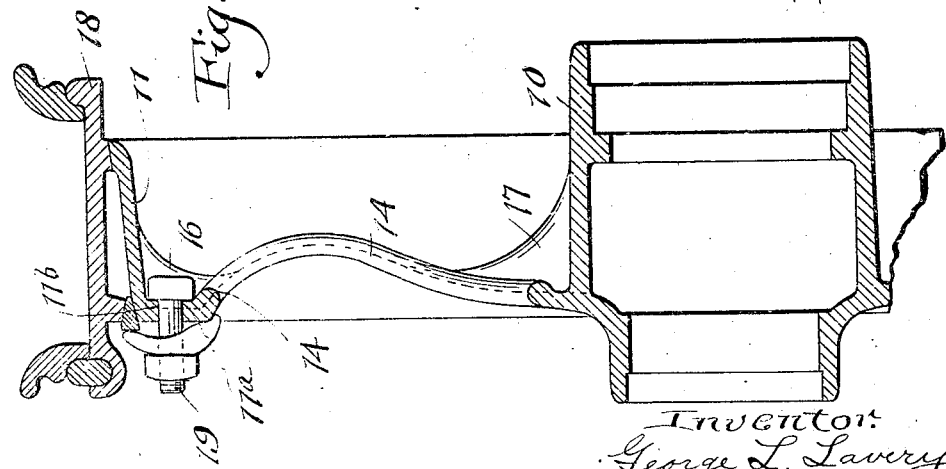
Inventor:
George L. Lavery
by
Thurston Rose & Hudson
attys

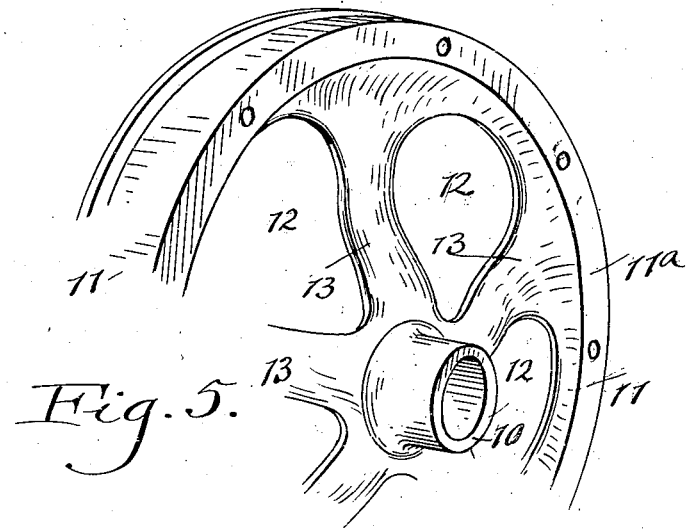
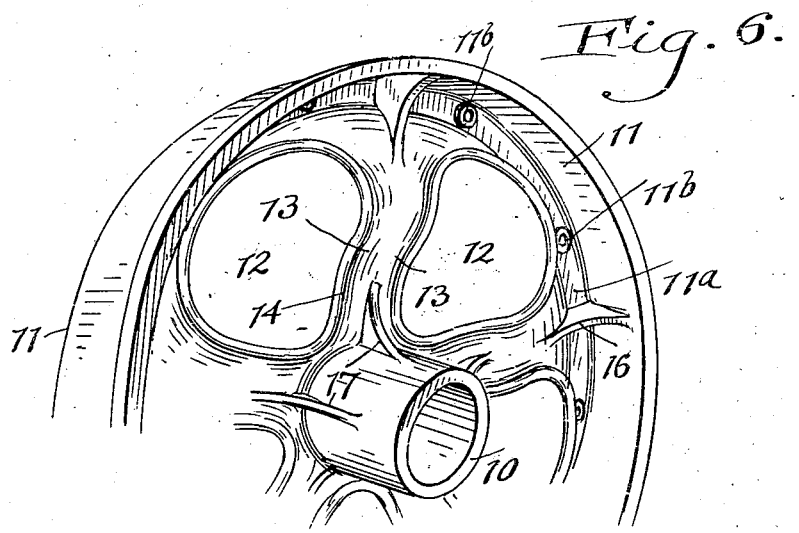

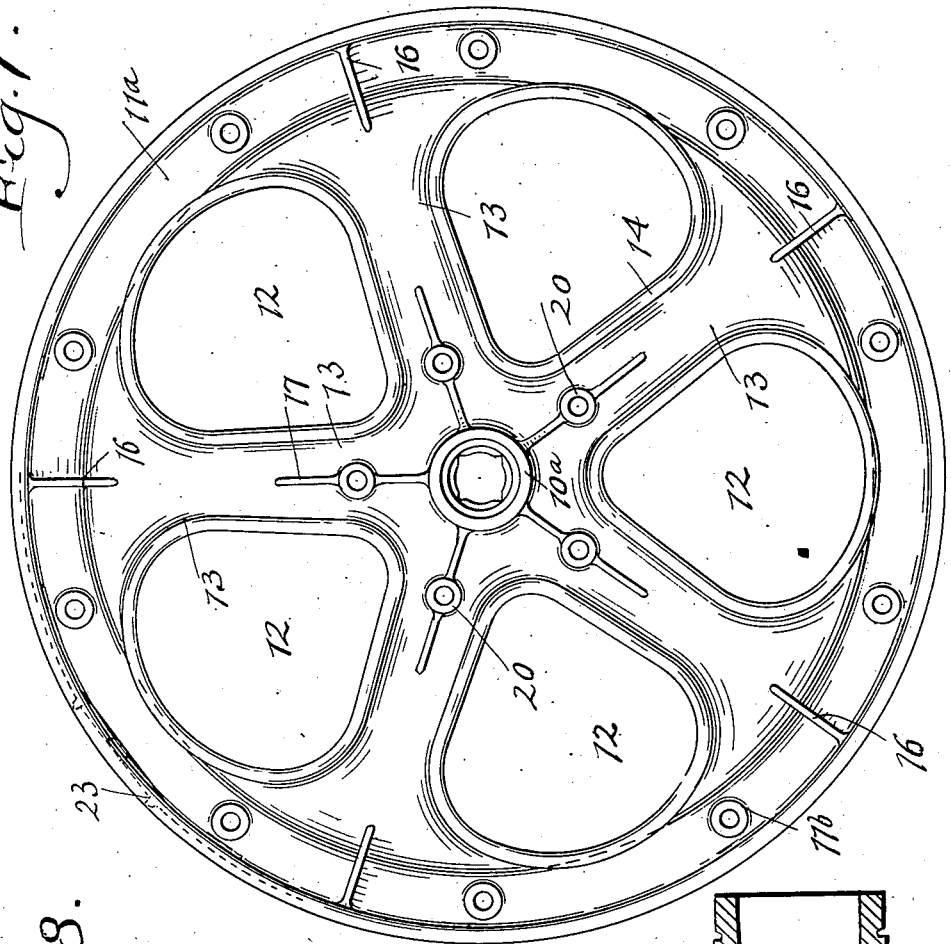
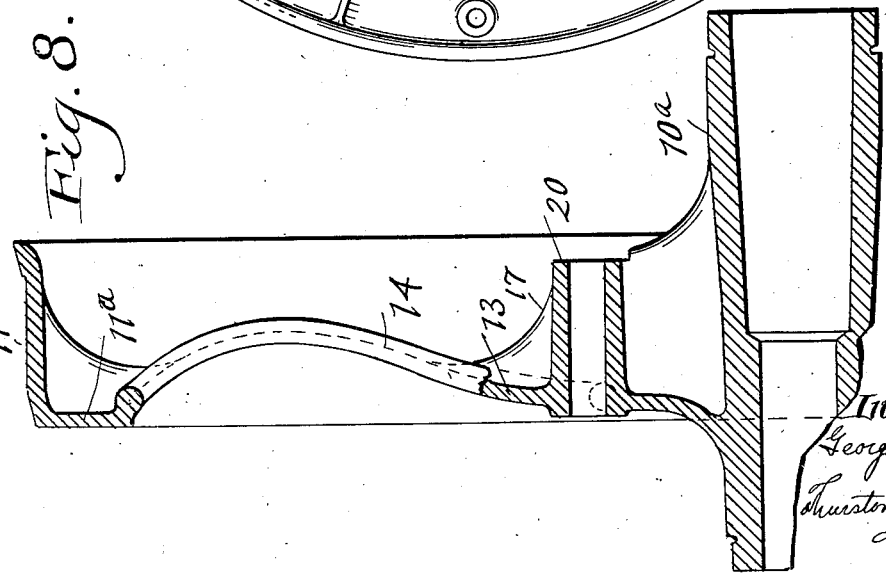

June 30, 1925.  1,544,242
G. L. LAVERY
CAST METAL WHEEL
Filed Dec. 11, 1922  4 Sheets-Sheet 4
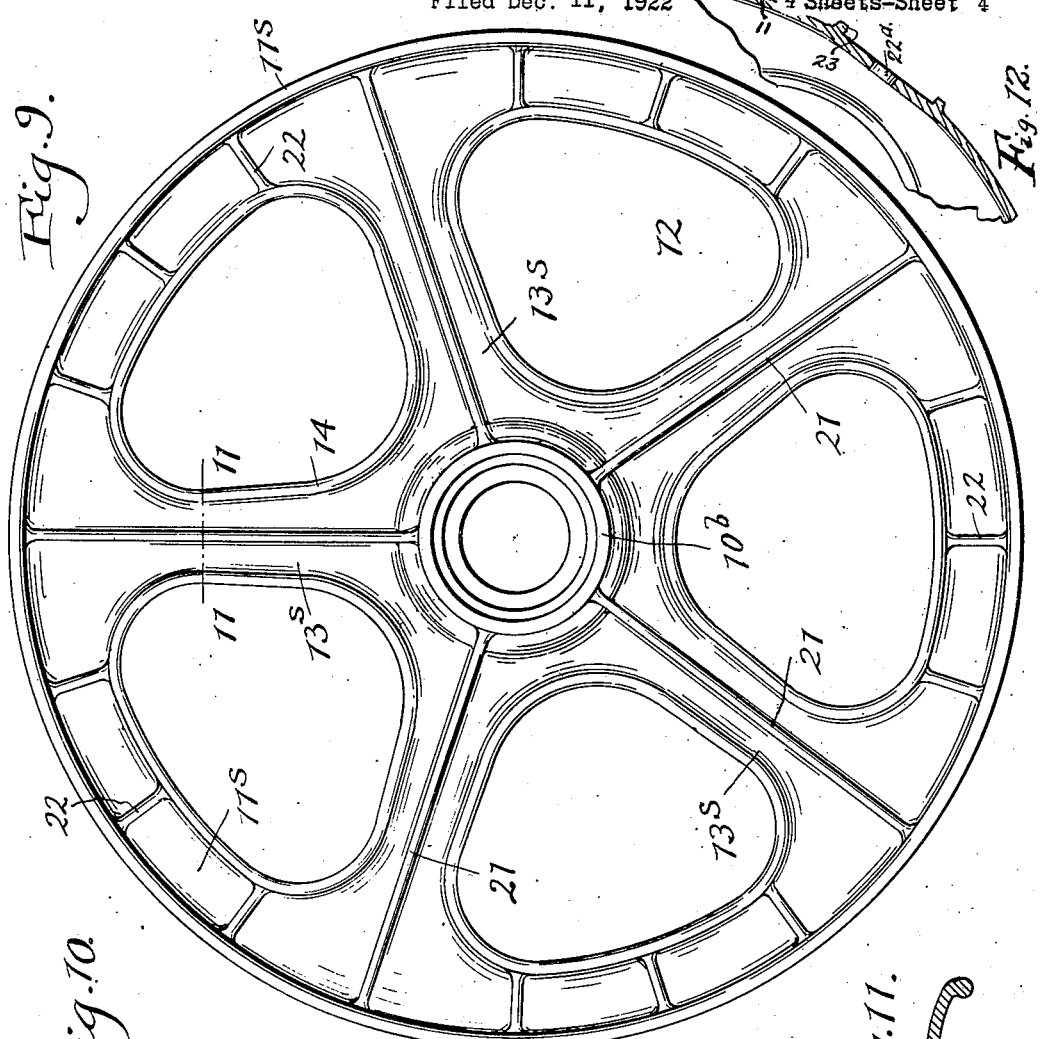
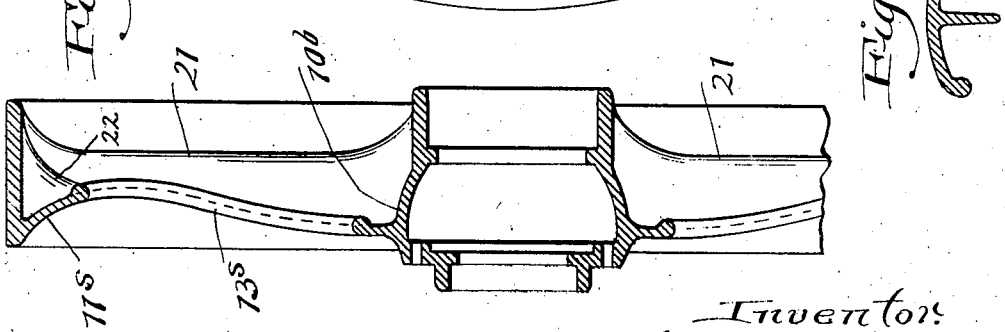
Inventor:
George L. Lavery
by
Thurston Bates & Hudson
Attys.

Patented June 30, 1925.

1,544,242

UNITED STATES PATENT OFFICE.

GEORGE L. LAVERY, OF CLEVELAND, OHIO, ASSIGNOR TO THE WEST STEEL CASTING COMPANY, OF CLEVELAND, OHIO, A CORPORATION OF OHIO.

CAST-METAL WHEEL.

Application filed December 11, 1922. Serial No. 606,062.

*To all whom it may concern:*

Be it known that I, GEORGE L. LAVERY, a citizen of the United States, residing at Cleveland, in the county of Cuyahoga and State of Ohio, have invented a certain new and useful Improvement in Cast-Metal Wheels, of which the following is a full, clear, and exact description.

This invention relates to cast metal wheels, particularly wheels for automotive vehicles such as passenger cars, trucks, delivery wagons and the like, adapted to be formed of cast steel or any other suitable cast metal or alloys having the required strength.

The principal object of the invention is to provide certain improvements which permit the wheels to be formed of thinner metal and of a less amount of metal, resulting in wheels relatively light in weight but nevertheless possessing to a high degree the features of strength and durability.

Further, the invention aims to provide a cast wheel construction such that the wheels may be produced inexpensively and in quantities with less foundry losses than with prior cast wheels, the percentage of defective wheels resulting from imperfect castings or breakage in cooling and in subsequent heat treatment being reduced to a minimum.

Cast metal wheels produced heretofore for automotive vehicles have been used very largely on heavy duty trucks, for the construction has been such that to provide the requisite strength they were required to be formed of very heavy section, and therefore had too great weight to adapt them for the relatively light weight vehicles. The field of use thus having been restricted, the number of cast metal wheels compared to wooden wheels used heretofore has been very small.

By the present invention the field of use of cast metal wheels is greatly enlarged, and is extended particularly to relatively light duty delivery trucks and wagons and passenger cars heretofore using wooden wheels, and this is attained by my invention which contemplates cast metal wheels of what may be termed the "semi-disk" type.

Without intending to limit myself to all the features here referred to, these semi-disk wheels are provided between the hub and rim portions with a thin disk-like body portion or web provided with suitably shaped openings forming the equivalent of spokes. These spokes are preferably curved in three directions to provide strength and resiliency and to compensate for stresses in cooling and avoid localized breakage stresses. Further, these spoke-like portions or arms in the nature of relatively thin curved webs are edged with beads or thickened portions which bound or circumscribe the openings and serve not only to strengthen the construction, but primarily as feeders to supply in the casting process ample fluid metal to the thinner portions of the wheel, preventing any part getting an insufficient amount of metal or a less amount than intended. Additionally they may be provided with radially disposed ribs to stiffen them and adapt the wheels for heavier service. All parts of the wheel are cast in one integral unit without the necessity for spoke cores which have been commonly employed in forming cast metal truck wheels and which are always liable to shift out of place resulting in uneven thickness.

A further improved feature resides in the fact that my improved wheels have what may be termed open rim sections which are self cleaning in operation and are adapted for receiving demountable rims or other pneumatic equipment as well as solid or cushion tires, the rim section employed by me permitting the use of any desired number of equally spaced rim bolts for securing the pneumatic equipment in place, and avoiding entirely the necessity for heavy bolt pads and long bolts heretofore universally employed in cast metal wheels.

The invention may be further briefly summarized as consisting in certain novel combinations and arrangements of parts which will be described in the specification and set forth in the appended claims.

In the accompanying sheets of drawings wherein I have shown certain preferred embodiments of the invention, Fig. 1 is a side elevation of a front wheel looking toward the inner side; Fig. 2 is an enlarged transverse sectional view of a portion of the wheel with pneumatic rim equipment in place; Figs. 3 and 4 are transverse sectional views substantially along the lines 3—3 and 4—4 respectively of Fig. 1; Figs. 5 and 6 are perspective views of portions of the wheel looking at the outer and inner sides thereof; Figs. 7 and 8 are views corresponding to Figs. 1 and 2, showing a rear wheel;

Figs. 9 and 10 are views corresponding to Figs. 1 and 2 and 7 and 8, showing a wheel for solid or cushion tires; Fig. 11 is a sectional view substantially along the line 11—11 of Fig. 9; and Fig. 12 is a fragmentary sectional view through a portion of the rim of wheels adapted to receive pneumatic equipment, this view illustrating the portion of the rim shaped to accommodate the creeper block of the demountable rim and the location of the opening for the valve stem.

My invention is applicable to both front and rear wheels, but reference will first be had to Figs. 1 to 6, showing a front truck wheel. This wheel has an annular hub 10, the precise shape or details of which are immaterial. Likewise, the wheel has a rim portion 11, and between the hub 10 and rim 11 a disk-like web, the three main parts, i. e. the hub, rim and connecting web being cast in one integral part or unit. The disk-like web which connects the rim to the hub is not a solid member but is modified by the application of openings which may have any desired shape and these openings form the equivalent of spokes in the web, and is further modified by certain curvatures and thickened portions provided for purposes to be referred to. But the connecting disk-like web is formed of relatively thin metal, so thin, in fact, that notwithstanding the modification referred to, in its thinness and its resiliency this wheel partakes of certain properties or characteristics of a disk wheel, and for that reason may be aptly termed a cast wheel of the semi-disk type.

Before referring to the openings and thickened portions which modify the web or disk, it may be mentioned that the latter is transversely bowed or curved, as will best be seen by reference to Fig. 2, the web extending from the hub at one side (the outer side) of the center plane of the wheel and then curving inwardly toward the center plane and then curving more abruptly and in the opposite direction to the rim and joining the latter at the outer side thereof. The chief advantages of this curvature are resiliency and the fact that it reduces to a minimum breakage stresses in cooling following casting of the wheels or in subsequent heat treatment, for the curved portion between the hub and rim allows a degree of yielding which compensates for what would otherwise be serious stresses often resulting in cracking or breakage. This curving can be utilized with its attendant advantages without the disadvantage of decreased strength due especially to other structural characteristics to be referred to. It is generally desirable though not necessary in all cases that the thickness of the web be slightly and gradually increased from the rim to the hub, and it is so shown in Fig. 2.

As before stated, the thin web is preferably provided between the hub and rim with openings, and as before stated, these openings may be of various shapes. In this instance, openings 12 are provided which are somewhat triangular in shape. This forms the equivalent of spokes 13, and as the corners or apices of the triangles are preferably well rounded as shown, the inner and outer ends of these spokes adjacent the hub and rim have a flaring shape forming a curvature in the second direction, this latter adding to the strength thereof.

As the spokes or portions of the web between the openings 12 are of very thin metal, and as it is, of course, important that in casting the metal be supplied in such a way as to provide uniform thickness where uniform thickness is desired, and as it would ordinarily be a difficult matter to have the metal flow from the middle or hub portion where the pouring is done outwardly to the rim, through the narrow space or spaces of the mold provided to form the web, it is important that means be provided for feeding the metal, and that the feeding means be in the form of relatively deep channels which will allow the metal to flow outwardly to insure all parts of the mold getting a sufficient amount of metal. To accomplish this result and also for strengthening purposes, the openings 12 are bounded or circumscribed by a beading or thickened portion 14, and while these portions form the equivalent of strengthening ribs which extend lengthwise of the spokes, and in that aspect perform a very important function in the completed wheel, nevertheless, in view of the thinness of the metal of the web between the beads 14, the enlarged or relatively deep portions of the molds untilized in forming these beads perform the equally important or even more important function of feeding the metal and causing it to be supplied in sufficient quantity to all parts of the wheel to produce the desired results, leaving at no point an insufficient amount of metal which would result in a defect.

For the purpose of providing still greater strength the spokes 13 are preferably curved in transverse section as best shown in Figs. 3 and 4. It will be seen, therefore, in view of this curvature, together with the curvature shown in Fig. 2 seen when the spokes are viewed edgewise, and the curvature seen in Fig. 2 with the spokes viewed from the side, curvatures of the spokes in three directions or of three distinct kinds are provided.

Additionally, for the purpose of providing increased strength the outer portions of the spokes are joined to the under side of the rim 11 by short curved ribs 16, and the inner portions of the spokes are joined to the hub 10 by similar ribs 17 these ribs being located in the center planes of the spokes. As will appear subsequently, there may be additional strengthening ribs between the rim and outer portion of the web, and if desired, full length ribs may be extended along the spokes between the hub and rim. In casting the channels in the mold forming these ribs have the function of feeding the metal to the extremely thin portions.

The rim section may be modified so as to make it applicable to standard forms of tire equipment, i. e. for demountable or detachable pneumatic tires and for solid or cushion tires. The rim 11 of the wheel shown in Figs. 1 and 2 is shaped to accommodate a demountable rim 18 for a pneumatic tire not shown. It will be observed that the web of which the spokes 13 constitute a part, joins or unites with the rim at one side thereof, which in practice is the outer side, the ribs and beads being on the inner side which is the side shown in Fig. 1, but regardless of whether the wheel is adapted for pneumatic tires or for the non-pneumatic, i. e. solid or cushion, the web preferably joins the rim at the outer side thereof, the rim proper projecting laterally toward the inner side of the wheel and overhanging, leaving on the inner side of the wheel an open construction which is self cleaning in the sense that there is no substantial closed space for the lodgment of dirt and the like.

For the wheels adapted to receive a pneumatic rim equipment, the rim is provided at the outer side thereof with an inwardly or radially extending flange-like portion 11$^a$ with which the web unites. This inwardly extending flange of the rim is preferably flat, and it is in this portion that the rim bolts 19 are carried, the flange being preferably provided on its inner face with short bolt pads 11$^b$, clearly shown in Fig. 1. In thus securing in place the pneumatic rim equipment I depart very materially from the present common practice. By way of explanation it may be stated that the present method of securing rims for pneumatic tires to cast steel wheel rims is similar to that which has been essential in wood wheel practice. That is to say, with the steel wheels used heretofore, heavy carriage bolts have been passed through enlarged bolt pads or bosses formed on the inner and outer faces of the cast steel felloe, utilizing a bolt of a length sufficient to pass through the entire width of the felloe as on a wooden wheel. Furthermore, with some forms of hollow spoke metal wheels it has been necessary to group the bolt pads at each spoke so that the bolts are spaced unequally and limited by the number of spokes in the wheel causing "wobbly" rims and consequently reducing the efficiency and durability of the tire.

With my present wheel with its open rim section, the rim securing bolts can be spaced equally, heavy bolt pads are omitted, permitting the use of short rim bolts 19, and resulting in a more nearly uniform metal section than would be the case with a rim having heavier or longer bolt pads adapted to accommodate bolts extending substantially the entire width of the rim.

In Figs. 7 and 8 I have shown a rear truck wheel formed in accordance with my invention. This wheel has a hub, here designated 10$^a$, joined to the rim 11 by a web shaped like or substantially like that of the front wheel and provided with openings 12 bounded by the bead or thickened portions forming the reinforced curved spokes 13, and having the other features specifically referred to in the description of Figs. 1 to 6, and to which the same reference characters are applied without further detailed description.

The rear wheel may be provided with suitable means for securing brake drums and internal gear drive mechanism as well as other types of drive without materially increasing the weight, and in this instance the spokes are provided near their inner ends with bolt pads 20 by which the brake drum may be secured in place.

Wheels having all the novel characteristics pointed out in connection with the wheels shown in Figs. 1 to 8 may be adapted for heavier service simply by the addition of longer, or a greater number of stiffening ribs, and when the wheel is adapted for solid or cushion tires it is preferably stiffened in the same manner. In Figs. 9 and 10 I have shown a wheel embodying all features of my invention already described, but stiffened for more severe service or for heavier loads. In this instance the wheel has a hub 10$^b$ which adapts it for a front wheel, though, of course, the invention in all its aspects is equally applicable to a rear wheel, and in this instance the rim here designated 11$^s$ is adapted for a solid or cushion tire, though, of course, this is not essential, this type of rim being shown simply for the purpose of showing equal application of the principal features of my invention to wheels for solid or cushion tires as well as for pneumatic tires. The hub and rim are joined by a web formed as already described, producing spokes here designated 13$^s$, similar in all respects to those first described, except that extending the full length thereof from the hub to the rim are stiffening ribs 21, these taking the place of the shorter ribs 16 and 17 of the wheels first described, and adapted for relatively light duty trucks. Additionally the wheel here shown is provided between the spokes with short ribs 22 joining the under side of the rim 11$^s$ with the web and arranged between the relatively long spokes 21. The wheel is otherwise like those first described, and further description of details is unnecessary.

Thus it will be seen that I have provided improvements in cast metal wheels which are relatively light in weight though possessing the features of great strength and resiliency, the resiliency being, of course, reduced in the construction shown in Figs. 9 and 10 by the long stiffening ribs extending the full distance between the rim and hub. However, notwithstanding the provision of these stiffening ribs, there is obtained a greater degree of resiliency than in prior cast metal wheels of which I am aware, and additionally the wheels contain less metal and are therefore lighter in weight than prior cast metal wheels of which I am aware adapted for similar load service. Furthermore, the strength and durability is greatly increased by the elimination of casting stresses in casting and the foundry loss is greatly reduced, all these features and characteristics enabling the wheels to be produced at materially reduced cost. Finally it might be stated that the design of the wheel is adaptable not only to cast steel but to any cast metal or alloys having the required strength, and especially those metals or alloys that require heat treatment or annealing. The invention is especially adapted for the latter since the surfaces of the metal are open on all sides so that the flame or heat can play equally in all directions, there being no covered or concealed surfaces which necessarily mean uneven heat treatment and stresses in the metal.

In conclusion it might be mentioned that as no cores are necessary in forming the spokes, I avoid the disadvantage of unequal spoke thicknesses due to shifting of cores, as exists in the production of cast wheels having hollow spokes. Furthermore, as no cores are necessary, I avoid the trouble and expense of walling off hollow spoke sections to separate the hub from the spokes, it being well known that spoke openings, as are required on cast wheels of the hollow spoke type, unless walled off, allow grease to work off from the central hub to the tires, lessening frictional contact and destroying tires, and permit sand and grit to work from the tire or rim portion down into the bearings in the hub.

I have previously mentioned the fact that my improved cast metal wheels partake in many respects of the characteristics of disk wheels. However, semi-disk wheels formed as contemplated by me and as herein illustrated, have in practice certain distinct advantages over the common type of disk wheels. Among these might be mentioned the comparative ease with which the tires on my improved wheels may be inflated, and in this connection it might be stated that with the common disk wheels a great deal of difficulty is encountered in inflating them from the inside, and while various schemes have been proposed for inflating them from the outside, these have not proved to be satisfactory, nor have they gone into very extensive use. On the other hand, with my improved wheels by reason of the provision of openings in the web, the opening for the valve stem can be and preferably is brought through the rim at one of these openings so that the tire can be inflated as readily as with the regular spoke type of wheel. In Fig. 12 I have shown a portion of a circumferential section of the rim of any of my improved semi-disk wheels adapted for pneumatic tire equipment, and in this view the opening of the valve stem is indicated by the reference character 22$^a$. I have also shown in this same view a portion 23 of the rim shaped to accommodate the creeper block of the demountable rim such as is commonly employed on all types of demountable rims.

It might be mentioned further that my improved semi-disk metal wheels are as compared with the common disk wheels more advantageously constructed for the application or removal of tire chains, the difficulty encountered in applying or removing chains from the disk wheels being entirely avoided with the wheels as herein described because of the openings in the webs.

I do not desire to be confined to the precise details shown, but aim in my claims to cover all modifications which do not involve a departure from the spirit and scope of my invention as set forth in the appended claims.

Having described my invention, I claim:

1. A cast metal wheel for automotive vehicles having a hub, a rim and connecting web cast integrally, the web having openings forming spokes which are bowed or curved laterally in longitudinal section and curved in transverse section.

2. A cast metal wheel for automotive vehicles having a hub, a rim and relatively thin spokes cast integrally, the spokes being curved in longitudinal section and in transverse section and flared at their ends.

3. A cast metal wheel for automotive vehicles comprising a hub, a rim and a relatively thin web cast integrally, the web having openings bounded by relatively thickened portions or beads and being curved or bowed laterally.

4. A cast metal wheel for automotive vehicles comprising a hub, a rim and spokes cast integrally, the spokes being relatively thin and having thickened portions extending longitudinally thereof, said spokes being bowed or curved laterally in longitudinal section.

5. A cast metal wheel for automotive vehicles comprising a hub, a rim and spokes cast integrally, the spokes being relatively thin and having thickened portions extending longitudinally thereof, said spokes being bowed or curved laterally in longitudinal section and being curved in transverse section.

6. A cast metal wheel for automotive vehicles comprising a hub, a rim and spokes cast integrally, the spokes being relatively thin and having thickened edge portions and being curved or bowed laterally in longitudinal section.

7. A cast metal wheel for automotive vehicles comprising a hub, a rim and spokes cast integrally, the spokes being relatively thin and having thickened edge portions and being curved in both longitudinal and transverse section.

8. A cast metal wheel for automotive vehicles comprising a hub, a rim and spokes cast integrally, the spokes being relatively thin and being curved laterally both inwardly and outwardly in longitudinal section between the hub and rim.

9. A cast metal wheel for automotive vehicles comprising a hub, a rim and spokes cast integrally, the spokes being relatively thin, said spokes being curved laterally both inwardly and outwardly in longitudinal section between the hub and the rim and being curved in transverse section.

10. A cast metal wheel for automotive vehicles comprising a hub, a rim and spokes cast integrally, the spokes being relatively thin and stiffened by longitudinally extending thickened portions and having a curvature in longitudinal section and in transverse section.

11. A cast metal wheel for automotive vehicles comprising a hub, a rim and spokes cast integrally, the spokes being in the form of relatively thin webs with thickened marginal portions, and with centrally disposed ribs at the ends.

12. A cast metal wheel for automotive vehicles comprising a hub, a rim and spokes cast integrally, the spokes being in the form of relatively thin webs with thickened marginal portions and with centrally disposed ribs connecting the spokes to the hub and to the rim.

13. A cast metal wheel for automotive vehicles comprising a hub, a rim and spokes cast integrally, the spokes being in the form of relatively thin laterally curved webs with thickened marginal portions and with centrally disposed ribs connecting the spokes to the hub and to the rim.

14. A cast metal wheel for automotive vehicles comprising a hub, a rim and spokes cast integrally, the spokes being in the form of relatively thin webs curved laterally in longitudinal section and in transverse section and provided with thickened marginal portions, there being ribs which connect the spokes with the hub and rim.

15. A cast metal wheel for automotive vehicles comprising a hub, a rim and a connecting web all cast integrally, the web joining the rim at one side thereof, and said web being bowed laterally and provided with openings forming curved spokes.

16. A cast metal wheel for automotive vehicles comprising a hub, a rim and a web connecting the two and all cast integrally, the web joining the rim at the outer side thereof, and said rim having an open section with a radial or inturned flange at its outer side merging with the web and having openings for receiving rim bolts for attaching pneumatic equipment thereto.

In testimony whereof, I hereunto affix my signature.

GEORGE L. LAVERY.